United States Patent
Walker et al.

[11] Patent Number: 6,158,344
[45] Date of Patent: Dec. 12, 2000

[54] LINEFEED CALIBRATION USING AN INTEGRATED OPTICAL SENSOR

[75] Inventors: Steven H. Walker; Steven P. Downing, both of Camas; Christopher M. Lesniak, Vancouver, all of Wash.

[73] Assignee: Hewlett-Packard Company, Palo Alto, Calif.

[21] Appl. No.: 09/205,057

[22] Filed: Dec. 3, 1998

[51] Int. Cl.[7] .................................................... B41L 39/00
[52] U.S. Cl. ............................ 101/484; 101/483; 347/5; 347/16; 400/282; 400/582
[58] Field of Search .................... 101/483, 484; 347/5, 16, 19; 400/279, 282, 582, 583, 583.3, 708, 709

[56] References Cited

U.S. PATENT DOCUMENTS

| | | | |
|---|---|---|---|
| 4,485,982 | 12/1984 | St. John et al. ........................ | 242/57.1 |
| 4,734,868 | 3/1988 | DeLacy ...................................... | 347/16 |
| 4,916,638 | 4/1990 | Haselby et al. .......................... | 364/519 |
| 5,806,430 | 9/1998 | Rodi ........................................ | 101/484 |

FOREIGN PATENT DOCUMENTS 1436540  5/1976  United Kingdom .

*Primary Examiner*—John S. Hilten
*Assistant Examiner*—Daniel J. Colilla

[57] ABSTRACT

A method of calibrating a media advance mechanism in a printer utilizes an optical sensor of the printer to detect printed marks on a calibration sheet. The marks on the calibration sheet are spaced at actual longitudinal intervals. The calibration sheet is advanced longitudinally past the printhead carriage, and the calibration marks are detected with the optical sensor. The printer determines the apparent or measured longitudinal intervals and compares them to the actual intervals to determine errors in positioning the calibration sheet.

16 Claims, 7 Drawing Sheets

LINEFEED CALIBRATION USING AN INTEGRATED OPTICAL SENSOR

TECHNICAL FIELD

This invention relates to printers, and more particularly, to methods and apparatuses that correct for paper positioning inaccuracies in printers.

BACKGROUND

In most printers, paper is advanced without any feedback regarding the actual paper position. Instead, it is assumed that the paper advances through the printer in direct relation to the motion of the printer's advance mechanism. References to the paper advance being "closed loop" or "servo-controlled" apply to the paper advance mechanism-not to the paper itself.

Open loop paper advance has worked well because the properties of paper are well understood and the required precision of the paper motion have not been great. With increased requirements for positioning accuracy, however, variations in media response and inaccuracies from drive roller eccentricity are contributing to a larger percentage of total paper advance error. As a result, efforts have been made to truly close the positioning loop by measuring the movement of the paper itself during operation of the printer. However, this technology is currently quite complex and prohibitively expensive.

Nevertheless, there is a pressing need for some method to calibrate a printer's media advance mechanism in a way that accounts for variations in the printer's components, variations in the printer's environment, and variations in the print media. The invention described herein meets this need.

SUMMARY

The invention utilizes an optical sensor mounted on the printhead carriage of a printer. The optical sensor is used to sense the relative longitudinal locations of calibration marks located on a calibration sheet. In one embodiment of the invention, such a calibration sheet is pre-printed with calibration marks at precisely known longitudinal intervals. To calibrate the paper advance mechanism, the calibration sheet is advanced through the printer while the optical sensor is positioned to detect the calibration marks. Calibration logic calculates the apparent space intervals between adjacent marks and compares them with the known intervals to determine the positioning error between each of the calibration marks.

In another embodiment of the invention, the calibration marks are printed by the printer itself, using the precisely spaced nozzles of the printhead. Pairs or sets of calibration marks are printed. Within each set, the calibration marks are spaced at actual, known intervals, by printing all marks of the set in a single printhead swath, using a single printhead nozzle or a single set of longitudinally-adjacent nozzles for each mark.

To determine positioning errors in this embodiment, the apparent spacing between the marks in any given set is compared with the actual spacing. Alternatively, the apparent pitch of the marks is compared with the actual pitch of the marks within a set. Sets are analyzed at positions corresponding to different positions of the printer's feed roller, to record errors that differ with the rotational position of the feed roller.

BRIEF DESCRIPTION OF THE DRAWINGS

FIG. 7 shows a calibration waveform having a nominal pitch. FIG. 8 shows a calibration waveform having a relatively decreased pitch. FIG. 9 shows a calibration waveform having a relatively increased pitch.

DETAILED DESCRIPTION

Figure 1:
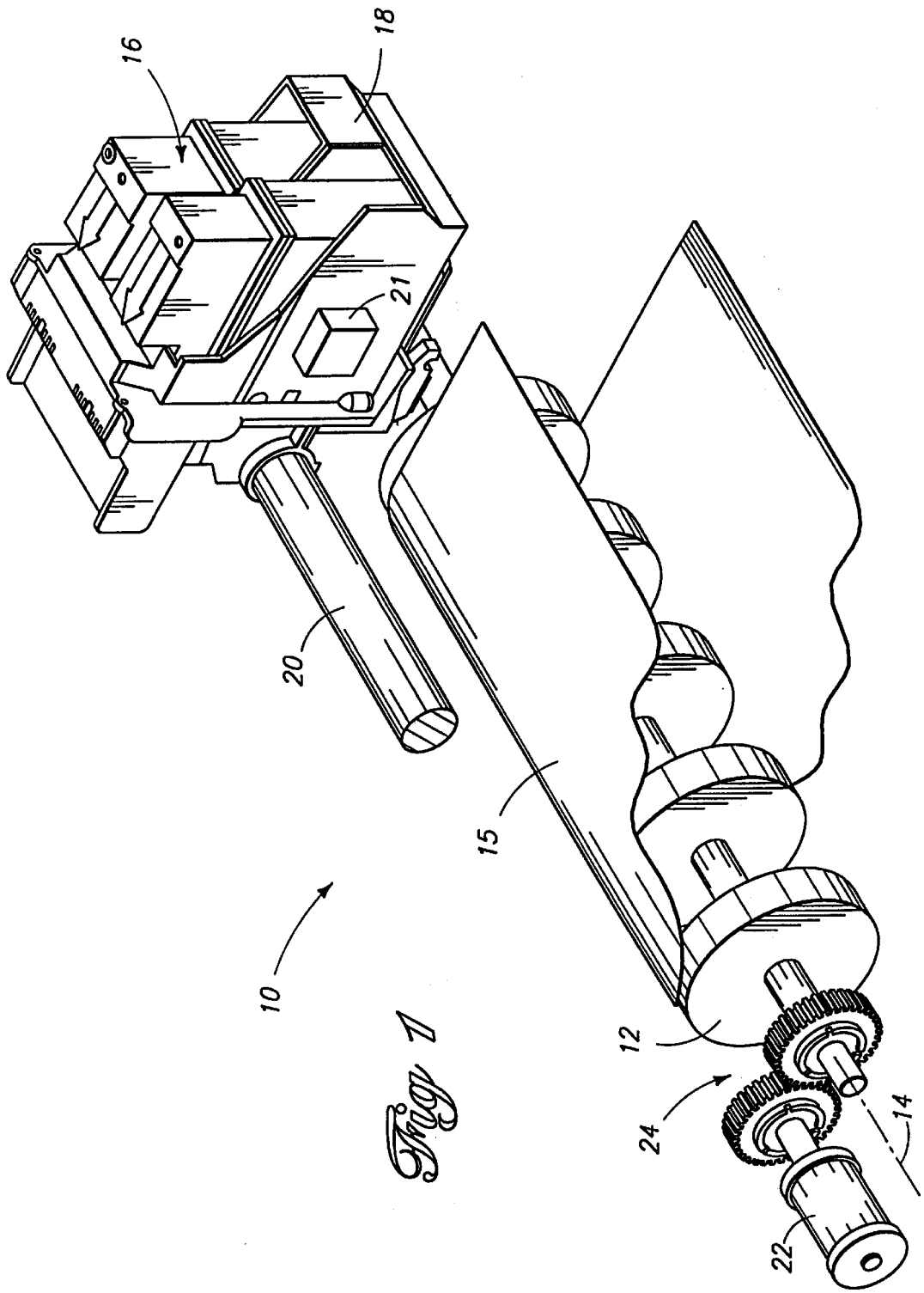
FIG. 1 is a perspective view of media advance and printhead mechanisms in accordance with the invention.

FIG. 1 shows a media advance and printhead 10 mechanism as used in a typical inkjet printer. It includes a feed roller or platen 12 that rotates about a paper axis 14 to advance paper 15 or some other printable sheet media past a printhead 16. The printhead is mounted on a carriage 18 that traverses transversely across the underlying paper and the supporting feed roller. The carriage is supported on a transverse carriage support rod 20 and is driven back and forth across the paper by a mechanism that is not shown. The term "transverse" indicates a direction across the paper that is perpendicular to the direction of paper movement. The term "longitudinal" is used to indicate a direction that is parallel with the direction of paper movement.

An optical sensor 21 is mounted to carriage 18 for transverse movement with the carriage. The optical sensor is used to detect printed portions of the underlying paper, and in the past has been used for various calibration functions relating primarily to inkjet printhead optimization. A sensor such as this is described in a co-pending United States Patent Application entitled "Monochromatic Optical Sensing System for Inkjet Printing", filed Jun. 30, 1997, having Ser. No. 08/885,486, and in a co-pending Patent Cooperation Treaty (PCT) Application filed in the United States Patent Office Mar. 24, 1998, entitled "Accelerated Illuminate Response System for Light Emitting Diodes," having Ser. No. PCT/US98/05834. Both of these patent applications are hereby incorporated by reference. Optical sensor 21, also referred to as a calibration sensor herein, is configured and positioned to detect calibration marks on the underlying paper. The sensor is preferably positioned downstream of the printhead's nozzles, so that any marks printed by the nozzles can be subsequently advanced past the sensor without reverse paper movement.

Figure 2:
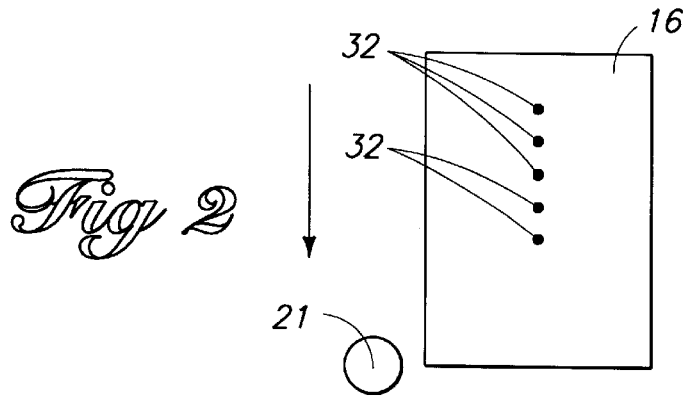
FIG. 2 is a conceptualized drawing of a printhead and associated optical sensor in accordance with the invention.

FIG. 2 illustrates a very simplified configuration of an inkjet printhead 16 having a plurality of nozzles 32. In this simplified example, the printhead has a single column of nozzles. The column extends longitudinally, in the direction of paper movement. Downstream paper movement is indicated by an arrow. For printing, the nozzle is moved transversely across the paper, and the appropriate nozzles are fired during this movement. FIG. 2 shows the position of optical sensor 21 relative to the nozzles. The sensor is located downstream from the nozzles so that it can detect printed marks on advancing paper, after the marks have been printed by one or more of the nozzles.

Although the illustrated printhead is sufficient for a conceptual understanding of the invention, it is noted that actual inkjet printers typically have several columns of longitudinally-staggered nozzles, and that each column typically contains a large number of nozzles ranging from 8 to 256 nozzles per column.

Referring again to FIG. 1, feed roller 12 is driven by a motor (not shown) through gearing 24. A position encoder (not shown) is connected to monitor the position of motor and/or roller 12. The position encoder might be associated directly with the motor or might alternatively be more closely associated with the feed roller to give more accurate position feedback.

Regardless of the accuracy of any roller position feedback, a media advance mechanism such as this often produces positioning errors. One type of error is constant over all rotational positions of the drive roller, and results in either underfeed or overfeed. Paper slippage relative to the drive roller is one source of this error. Because of such slippage, advancing the surface of the feed roller by a given distance results in paper movement of a slightly smaller distance. The amount of slippage is generally consistent over all rotational positions of the feed roller, although slippage tends to vary with different types of paper. In addition, slippage varies to some degree as a function of environmental conditions such as temperature and humidity. Constant underfeed or overfeed might also result from inaccuracies in the diameter of the feed roller, due to manufacturing tolerances.

Eccentricity error is another type of positioning error encountered in printers, resulting from eccentricity of the feed roller and from non-concentric mounting of the encoder disk. As a result of such eccentricity, advancing the feed roller by a small amount produces a different amount of paper movement, depending on the rotational position of the feed roller. The error is repeatable at any given rotational position of the feed roller, but varies from position to position. The eccentricity error does not generally vary as a function of paper type or environmental conditions. In some printers, two encoder disks, mounted at 180° from each other, are used to account for eccentricity errors generated by non-concentric encoder mounting. However, this is an expensive solution.

Figure 3:
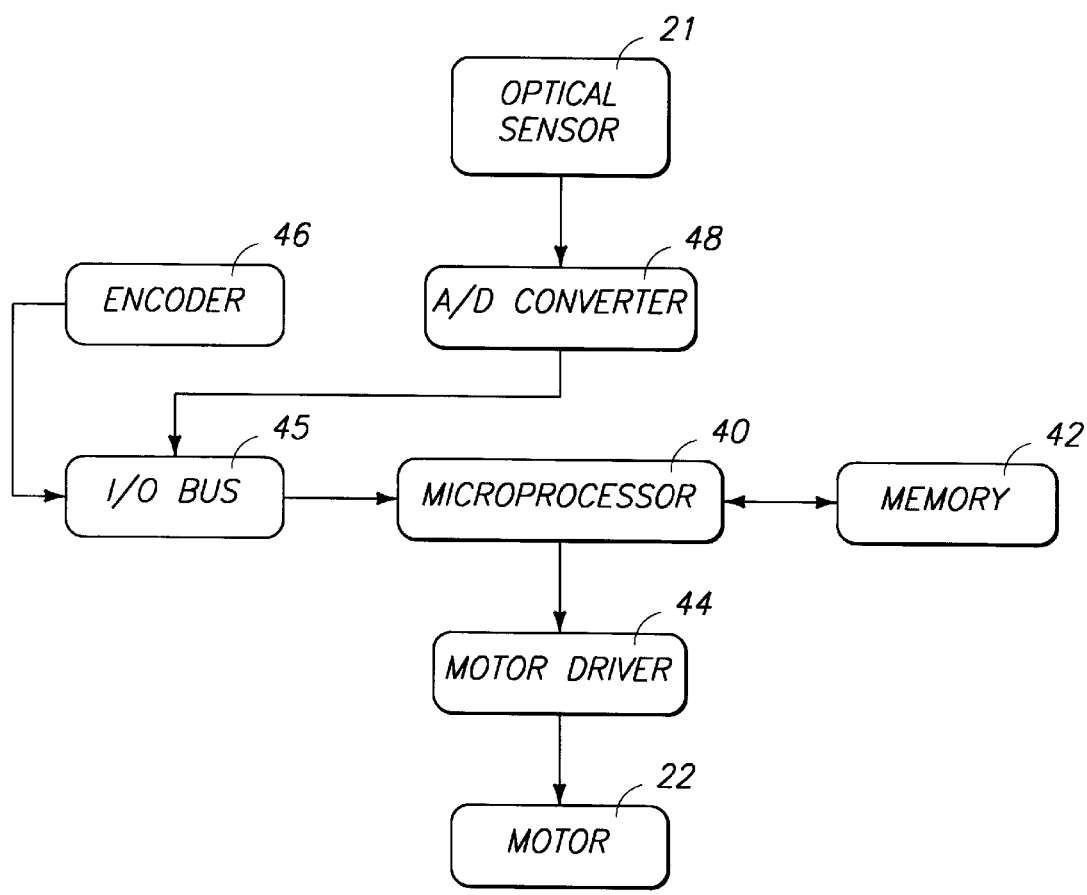
FIG. 3 is a block diagram of control and logic components for performing the steps described below in accordance with the invention.

FIG. 3 illustrates components of a printer used to control the operation of the media advance and printhead mechanism shown in FIG. 1. These components include a programmable microprocessor 40 and associated memory 42. The microprocessor is programmed in accordance with the description given herein to perform the described steps and calculations. As is conventional practice, the microprocessor is programmed by way of instructions stored in and retrieved from memory 42.

The microprocessor is connected through a motor driver 44 to control the movement of motor. In addition, the microprocessor utilizes an I/O bus 45 through which it communicates with a feed roller encoder 46. The optical sensor 21 is connected to an analog-to-digital converter 48, which supplies digital values to microprocessor 40 through I/O bus 45. The digital values indicate the brightness of the paper underlying the optical sensor. For purposes of illustration, high values indicate white paper, and low values indicate printed marks on the paper.

Figure 4:
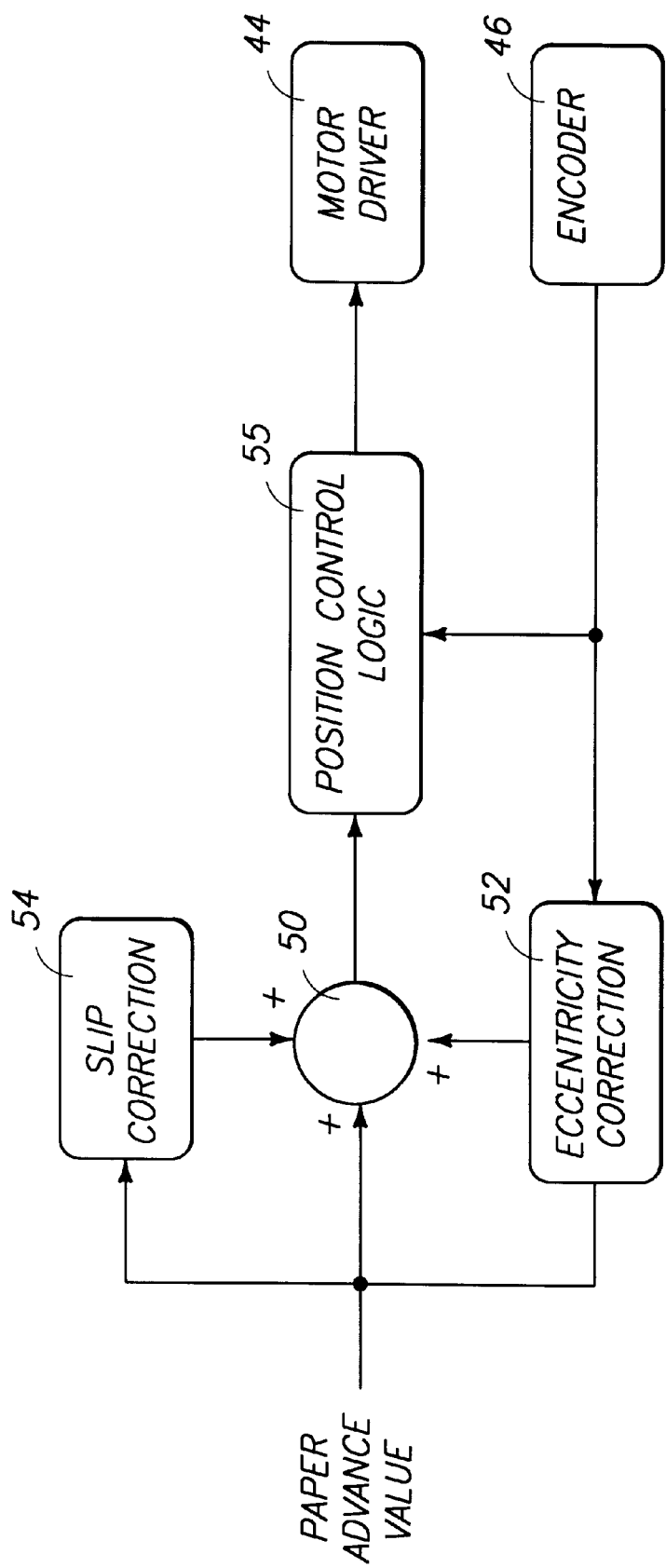
FIG. 4 is a control diagram showing the application of slip correction and eccentricity correction in accordance with the invention.

FIG. 4 illustrates logical functions performed by the control components of FIG. 3. A paper advance value is supplied to a summing function 50. The paper advance value is also supplied to an eccentricity correction function 52 and a slip correction function 54. These functions calculate correction differentials corresponding to the supplied advance value. These differentials are summed in summing function 50 with the original advance value, to produce a corrected advance value that is supplied to the printer's feed roller position control logic 55. The feed roller control logic uses this value in conjunction with the motor driver 44 and position encoder 46 to control the nominal position of the feed roller. Note that the eccentricity correction function 52 is dependent on the actual rotational position of the feed roller, and thus receives a position signal from encoder 46.

Three different terms are used herein to describe values and measurements such as position, spacing, pitch, etc. An "actual" value is a value that is somehow known with a degree of precision that is independent of the printer's media advance mechanism and position control logic.

A "nominal" value is one that is known only from the relatively inaccurate standpoint of the printer's media advance mechanism. Furthermore, a nominal value is one that is known as a result of having printed one or more elements at assumed positions of the media advance mechanism. For instance, two lines can be spaced by a nominal distance by printing a first line with a particular printhead nozzle, commanding the paper advance mechanism to move by the nominal distance, and then printing a second line with the same printhead nozzle. Because of inaccuracies in the advance mechanism, any nominal value is likely to be somewhat inaccurate.

An "apparent" value is similar to a nominal value, in that an apparent value is known only from the standpoint of the printer's media advance mechanism. However, an apparent value is one that is measured rather than printed. To measure an apparent value, the printer advances calibration marks past a sensor and the sensor detects the marks. The apparent position of a mark is equal to the nominal position of the media advance mechanism at the point where the mark was detected.

The term "error" is also used in conjunction with different values. An error value is the difference between a nominal value and its corresponding actual value. For example, a printer might be commanded to print two lines at a nominal distance from each other. The difference between this nominal distance and the actual distance between the lines is referred to as the positioning error of the media advance mechanism over the commanded nominal distance.

The invention includes a method of calibrating a media advance mechanism in a printer having a printhead carriage, an associated printhead with one or more nozzle columns, and an optical sensor as described above. The media advance mechanism controls the nominal positions of the paper as the paper advances past the carriage and printhead. In practice, slip error and eccentricity error are not separately identified. In an advance mechanism having only an incremental form of position feedback (rather than absolute feedback), slip error is measured as an average error over one or more revolutions of the feed roller. When absolute feedback is available, absolute positioning error is measured at a plurality of discrete rotational positions of the feed roller. These discrete measurements inherently account for both slippage and eccentricity.

In accordance with one embodiment of the invention, a calibration sheet is prepared having calibration marks spaced at actual longitudinal intervals along the calibration sheet. The calibration marks preferably comprise thin horizontal bars, positioned in a column. The bars are located at precisely known intervals, established by an accurate means other than the printer itself, such as by lithography.

Figure 5:
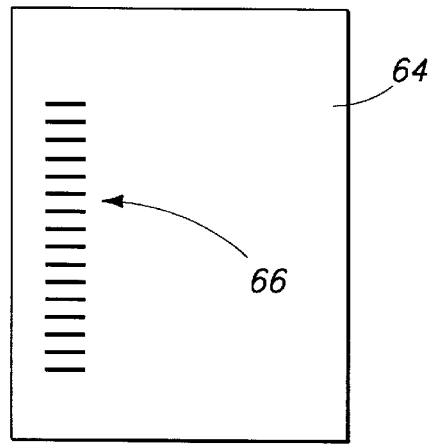
FIG. 5 is a representation of a pre-printed calibration sheet in accordance with the invention.

FIG. 5 shows an example of a calibration sheet 64 such as this, having a column of calibration marks 66.

Figure 6:
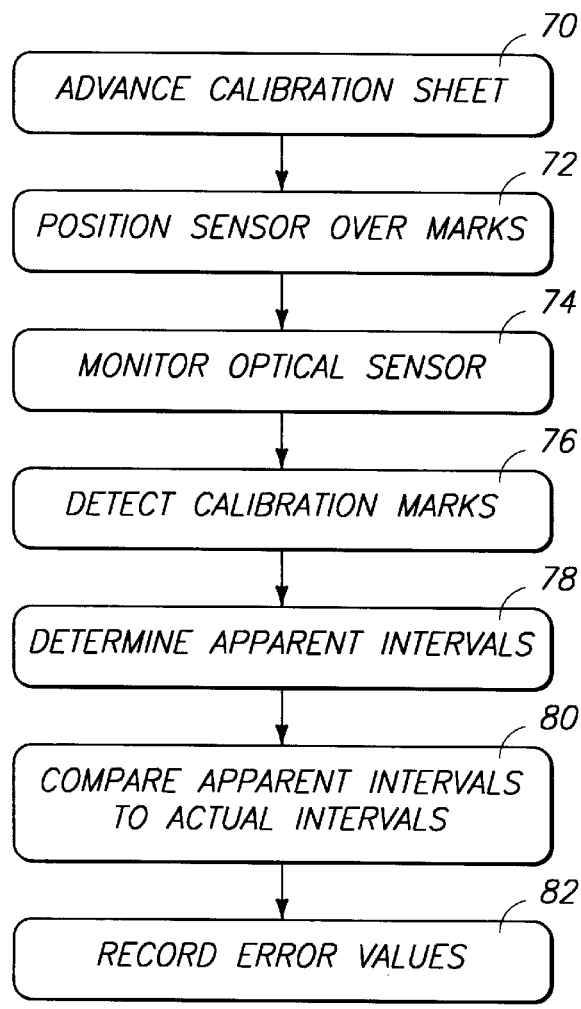
FIG. 6 is a flowchart showing preferred steps in accordance with one embodiment of the invention.

FIG. 6 shows steps in determining positioning errors in conjunction with calibration sheet 64. A step 70 comprises advancing the calibration sheet longitudinally past the printhead carriage.

A step 72 comprises positioning the optical sensor 21 so that the calibration marks pass beneath the sensor during the advancing step. Step 74 comprises monitoring the optical sensor during the advancing step, and recording digital values representing the brightness of the underlying paper relative to the position of the media advance mechanism. The resulting values are represented as a waveform in FIG. 7, in which the horizontal axis represents longitudinal movement of the paper and the vertical axis represents the brightness of the paper underlying the sensor. Calibration marks produce the valleys in the waveform, with the minimum values of the valleys corresponding to the apparent positions of the bars.

Referring again to FIG. 6, step 76 comprises detecting or calculating the positions of the calibration marks from the recorded digital values. The position of the drive roller at the minimum values or valleys of the waveform define the positions of the marks. For better resolution, a curve-fitting algorithm can be used to interpolate between the data points to estimate the true minimum value or the true center of a calibration mark.

Step 78 comprises determining the apparent longitudinal intervals between the calibration marks. This step is based on the nominal positions of the feed roller at the points when the calibration marks are detected by the optical sensor. Specifically, this step comprises determining the nominal positions of the media advance mechanism at the moments when the calibration marks are beneath the optical sensor. The differences between these nominal positions comprise the apparent intervals between the calibration marks.

Step 80 comprises comparing the apparent longitudinal intervals with the actual longitudinal intervals of the calibration marks to determine paper positioning errors produced by the media advance mechanism. For each interval, the positioning error equals the difference between the actual interval and the apparent interval. If the apparent interval is smaller than the actual interval, the paper has advanced too far relative to the desired movement. If the apparent interval is larger than the actual interval, the paper has not advanced far enough during that interval. The interval errors can be mapped individually to different rotational positions of the feed roller (in systems with absolute feedback), or averaged to determine characteristic slip of the feed roller (in systems without absolute feedback). Step 82 comprises recording the error values for use in the correction functions of FIG. 4.

Figure 7:
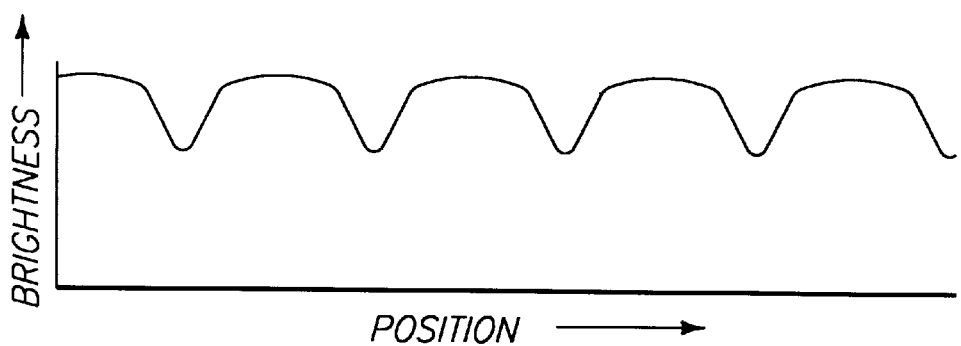
FIGS. 7–9 are graphs of calibration waveforms in accordance with the invention.

Rather than simply detecting minimum values of the waveform shown in FIG. 7, characteristic slip can be determined by fitting a sinusoidal waveform to the actual measured waveform and then noting the fundamental frequency of the sinusoidal waveform. This frequency will correspond to the apparent pitch of the calibration marks, and can be compared to the actual pitch of the calibration marks to determine average slip error.

To rapidly ascertain the pitch or spatial frequency of a given set of data, it is most efficient to calculate a Fourier transform. The pitch will then be represented as the frequency component having the greatest magnitude. The data will always be an "even function," and the cosine terms of the Fourier series will thus represent the data. The transform is, in effect, fitting a series of discrete cosine waves to the data. Since by design the data is periodic and symmetric, the cosine term containing the spatial frequency of interest (the pitch) will always have a markedly greater magnitude.

Figure 8:
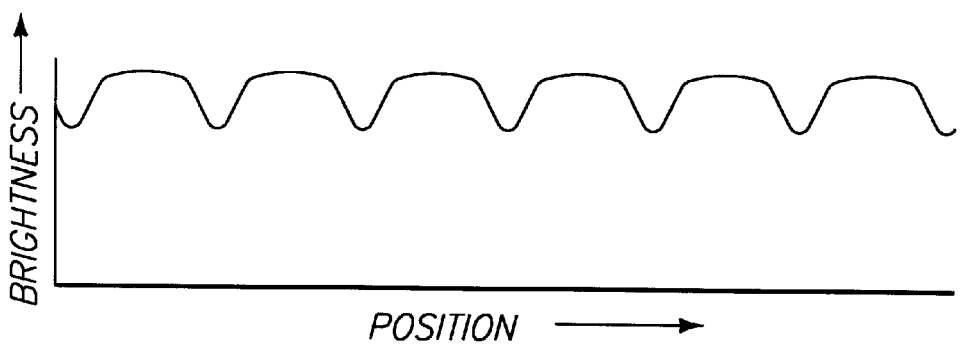
Figure 9:
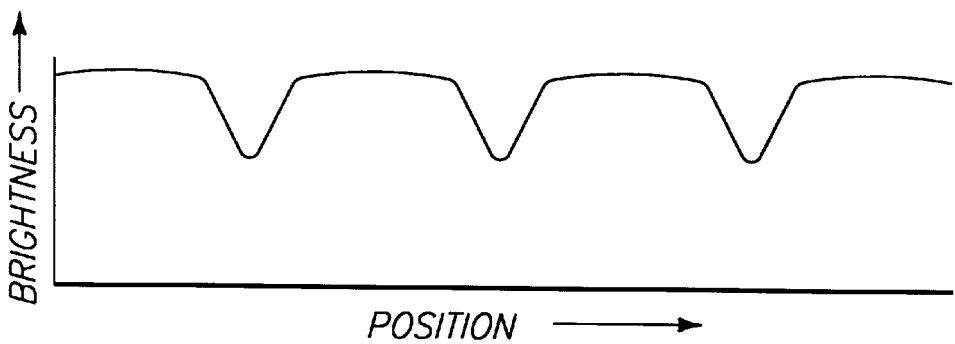

FIG. 8 shows a waveform indicating a decreased pitch, in comparison to the nominal waveform of FIG. 7. This waveform indicates that the paper advances farther than the nominal distance advanced by the media advance mechanism. FIG. 9 shows the opposite situation, where the paper advances less than the nominal distance advanced by the feed roller. In this situation the pitch increases, indicating that the paper takes longer to move from one calibration mark to the next.

As a variation of this embodiment of the invention, the calibration marks can be printed by the printer itself. To establish known intervals between the marks, they are printed with longitudinally spaced nozzles or dot positions of the printhead, in a single pass or swath of the printhead, without moving the feed roller. Within the swath, a single nozzle or a single set of longitudinally-adjacent nozzles is used to print a single corresponding mark. After the calibration marks are printed, each with its own nozzle, the carriage is positioned so that the optical sensor is in line with the calibration marks, and the paper is advanced to pass the calibration marks beneath the optical sensor while monitoring the output of the optical sensor. This technique takes advantage of the precise tolerances with which inkjet nozzles are typically positioned in the printhead. A disadvantage, however, is that the marks can extend longitudinally for no more than the height of a single nozzle column. However, this technique is useful for measuring constant errors such as those from paper slippage and/or feed roller diameter inaccuracies.

To measure non-constant errors such as eccentricity errors, multiple swaths are used to print multiple sets of calibration marks at incremental longitudinal positions along a calibration sheet. Actual spacings between the marks within each set are known, due to each set being printed in a single swath with precisely spaced nozzles. The optical sensor is then used to measure the apparent intervals within each set, which are compared to the known actual intervals to determine positioning error at different positions of the feed roller.

Figure 10:
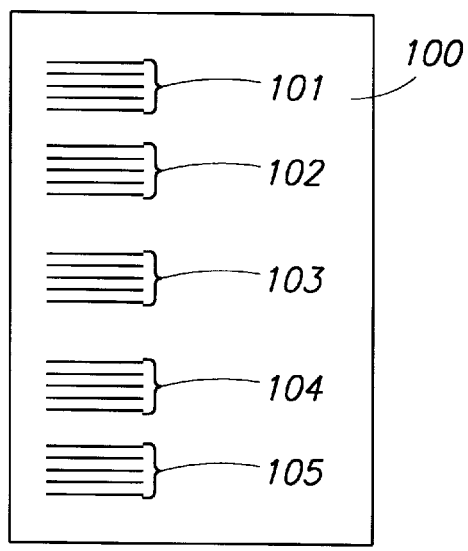
FIG. 10 is a representation of a calibration sheet printed by a printhead in accordance with the invention.

FIG. 10 illustrates a calibration sheet 100 printed in this manner, wherein each set of calibration marks includes five marks. The sets are labeled 101 through 105, and correspond to different rotational positions of the feed roller. Note that within each set, spacing is consistent. This is because each set is printed with a single printhead swath, without feed roller rotation. However, the spacing between sets varies as a function of drive roller eccentricity and other errors. Between sets 101 and 102 the spacing is small, indicating underfeeding. Between sets 103 and 104 the spacing is large, indicating overfeeding.

Figure 11:
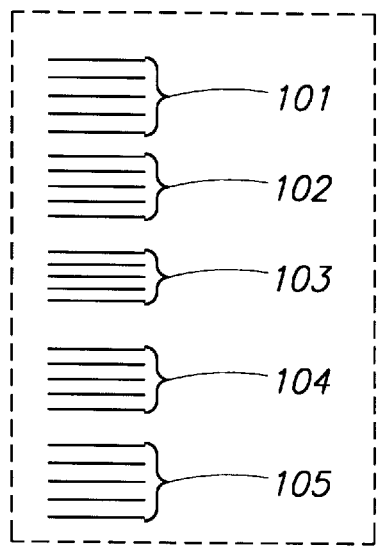
FIG. 11 shows apparent positions of the marks of the calibration sheet of FIG. 10.

FIG. 11 shows the apparent positions of the calibration marks, as they appear to the calibration system of the printer. Set 101, which was printed at a position of the feed roller corresponding to underfeed, has an apparent spacing or pitch that is greater than would be expected. This is because the feed roller rotates farther than expected in order to produce a particular amount of paper movement. Set 103, which was printed at a position of the feed roller corresponding to overfeed, has an apparent spacing or pitch that is less than would be expected. This is because the feed roller rotates less than expected in order to produce a particular amount of paper movement. Thus, the apparent pitches of the sets of calibration marks at different positions of the feed roller can be compared against the actual pitches to determine the amount of overfeed or underfeed at each of the different positions. If desired, a sinusoidal waveform can be fitted to these errors in order to interpolate errors at every position of the feed roller.

Resolution of the calibration measurements can be improved by limiting each set of calibration marks to a pair of spaced calibration marks and by overlapping the pairs.

Figure 12:
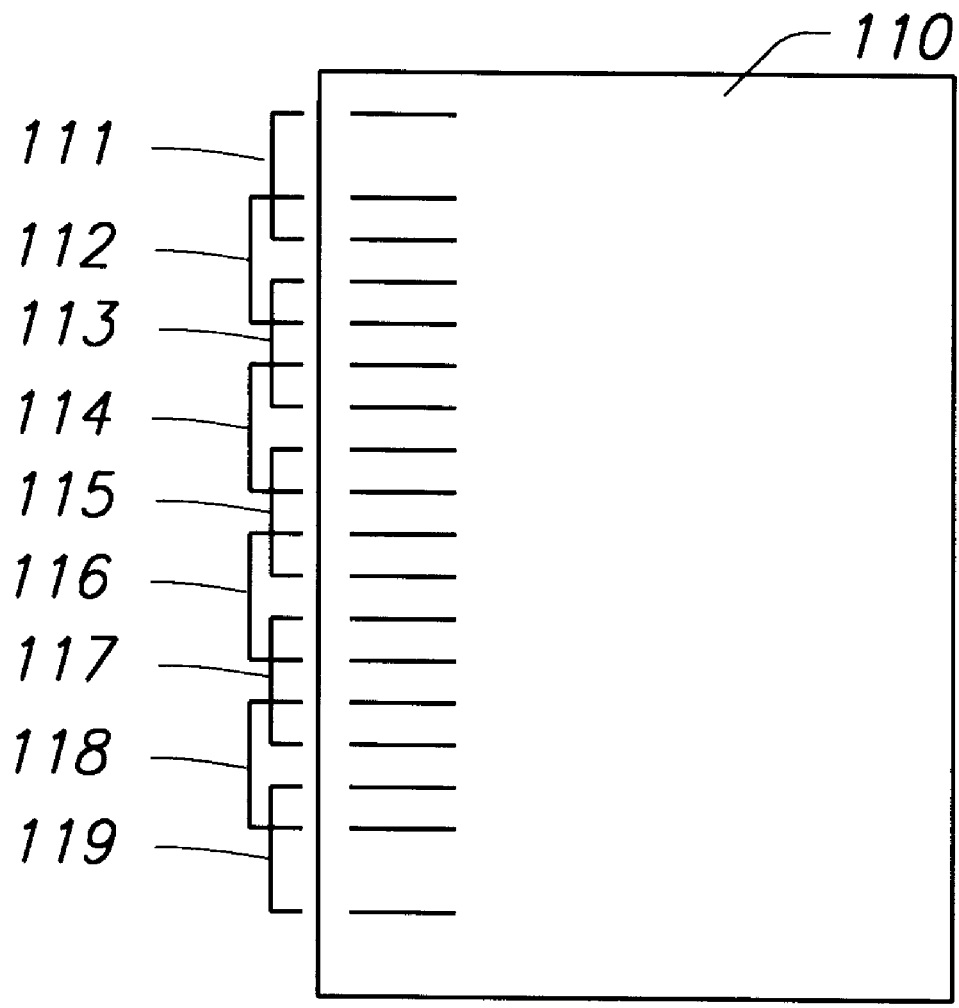
FIG. 12 is a representation of another calibration sheet printed by a printhead in accordance with the invention.

FIG. 12 shows an example of a calibration sheet 110 containing overlapped pairs of marks 111 through 119. The interval between each pair of marks is known because each pair is printed with a single printhead pass. Using the optical sensor, the apparent interval is determined for each pair. The difference between the actual interval and the apparent interval of a particular pair indicates the amount of positioning error at that particular feed roller position.

Using the printhead itself to print calibration marks provides a way to determine positioning errors at different rotational positions of the feed roller, thereby measuring error due to roller eccentricity and other periodic errors introduced by a roller drive mechanism (in addition to slip errors). This method has the advantage that it can be accomplished without a pre-printed calibration sheet, on the specific print media that is being used in the printer.

The error measurement functions described above effectively measure actual advance of the surface of the paper. At a minimum, the techniques can be used to measure and compensate for characteristic paper slip. If absolute position feedback is available from the feed roller, the techniques can also be used to measure and compensate for eccentricity and other non-constant or cyclical errors. Because the calibration is performed along with other printing system calibrations, it will usually be unnoticed by the user.

The invention increases the accuracy of paper advance without an increase in cost or risk. Cost is not increased because the technique leverages the hardware capability of the printer's existing optical sensor. The remainder of the invention is computational, requiring only nominal memory and processor bandwidth, which are already available.

Risk is minimal because the invention addresses a large source of error that remains in current media advance mechanisms. Current printers make no attempt to minimize this particular portion of the error. The odds are thus high that even crude compensation will be beneficial. Since there are no hardware changes, the risk of system-level interactions is also improbable.

Total system cost may be reduced as a result of the invention. The drive rollers are currently some of the most expensive components in the print mechanism. Part of this expense is attributable to the post-process finish grinding that must be performed to bring the rollers into specification for eccentricity. Since the invention is able to measure and compensate for eccentricity in each roller, it may be possible to omit the post-process grinding.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of calibrating a media advance mechanism in a printer having a printhead carriage and a calibration sensor, wherein the media advance mechanism controls the nominal positions of a printable medium as the printable medium advances past the printhead carriage, the method comprising:

advancing a calibration sheet longitudinally past the printhead carriage, wherein the calibration sheet has calibration marks spaced at actual longitudinal intervals;

detecting the calibration marks with the calibration sensor during the advancing step;

determining apparent longitudinal intervals between the calibration marks based on the nominal positions of the media advance mechanism when the calibration marks are detected by the calibration sensor;

comparing the apparent longitudinal intervals with the actual longitudinal intervals to determine media positioning errors produced by the media advance mechanism; and printing the calibration marks on the calibration sheet with the printhead is carriage;

wherein determining the apparent longitudinal intervals comprises determining apparent longitudinal intervals between pairs of calibration marks printed in single swaths of the printhead carriage.

2. A method as recited in claim 1, further comprising establishing the calibration marks on the calibration sheet by a means other than the printer itself.

3. A printer having control logic that is configured to perform the method recited in claim 1.

4. A method of calibrating a media advance mechanism in a printer having a printhead carriage and a calibration sensor, wherein the media advance mechanism controls the nominal positions of a printable medium as the printable medium advances past the printhead carriage, wherein the printhead carriage includes a printhead having a plurality of dot positions; the method comprising:

advancing a calibration sheet longitudinally past the printhead carriage, wherein the calibration sheet has calibration marks spaced at actual longitudinal intervals;

detecting the calibration marks with the calibration sensor during the advancing step;

determining apparent longitudinal intervals between the calibration marks based on the nominal positions of the media advance mechanism when the calibration marks are detected by the calibration sensor;

comparing the apparent longitudinal intervals with the actual longitudinal intervals to determine media positioning errors produced by the media advance mechanism; and printing the calibration marks on the calibration sheet with corresponding printhead dot positions;

wherein determining the apparent longitudinal intervals comprises determining apparent longitudinal intervals between pairs of calibration marks printed in single swaths of the printhead carriage.

5. A method of calibrating a media advance mechanism in a printer having a printhead carriage and a calibration sensor, wherein the media advance mechanism controls the nominal positions of a printable medium as the printable medium advances past the printhead carriage, wherein the printhead carriage includes a printhead having a plurality of nozzles; the method comprising:

advancing a calibration sheet longitudinally past the printhead carriage, wherein the calibration sheet has calibration marks spaced at actual longitudinal intervals;

detecting the calibration marks with the calibration sensor during the advancing step;

determining apparent longitudinal intervals between the calibration marks based on the nominal positions of the media advance mechanism when the calibration marks are detected by the calibration sensor;

comparing the apparent longitudinal intervals with the actual longitudinal intervals to determine media positioning errors produced by the media advance mechanism;

printing the calibration marks on the calibration sheet with corresponding printhead dot positions; and determining the apparent longitudinal intervals comprises determining apparent longitudinal intervals between pairs of calibration marks printed in respective single swaths of the printhead carriage.

6. A method as recited in claim 1, wherein the calibration sensor is an optical sensor.

7. A method as recited in claim 1, wherein the calibration sensor is an optical sensor mounted for transverse movement with the printhead.

8. A method of calibrating a media advance mechanism in a printer having a transversely traversing printhead with a plurality of dot positions, wherein the media advance mechanism controls the nominal position of a printable medium as the printable medium advances longitudinally past the printhead, the method comprising the following steps:

printing pairs of calibration marks on a printable medium using one or more corresponding ones of the printhead dot positions in individual printhead swaths so that the pairs of calibration marks are spaced at actual longitudinal intervals;

advancing the printable medium past a calibration sensor that detects the calibration marks;

determining apparent longitudinal intervals of the pairs of calibration marks based on the nominal positions of the media advance mechanism when the calibration marks are detected by the calibration sensor during the advancing step;

comparing the apparent longitudinal intervals with the actual longitudinal intervals to determine media positioning errors produced by the media advance mechanism.

9. A method as recited in claim 8, wherein the calibration sensor is an optical sensor mounted for transverse movement with the printhead.

10. A method as recited in claim 8, wherein the printhead is an inkjet printhead having nozzles corresponding to the dot positions.

11. A printer having control logic that is configured to perform steps comprising the steps recited in claim 8.

12. A method of calibrating a drive roller advance mechanism in a printer having a transversely traversing printhead with a plurality of dot positions, wherein the drive roller advance mechanism controls the nominal positions of a printable medium as the printable medium advances longitudinally past the printhead, comprising the following steps:

printing pairs of calibration marks on a printable medium at nominal longitudinal positions corresponding to nominal rotational positions of a printer drive roller, wherein each pair is printed in a single printhead swath using selected longitudinally spaced printhead dot positions to space the calibration marks of the pair at an actual longitudinal interval;

advancing the printable medium past a calibration sensor that detects the calibration marks;

determining apparent longitudinal intervals of the pairs of calibration marks based on the nominal positions of the drive roller advance mechanism when the calibration marks are detected by the calibration sensor during the advancing step;

comparing the apparent longitudinal intervals with the actual longitudinal intervals to determine media positioning errors produced by the drive roller advance mechanism at different rotational positions of the drive roller.

13. A method as recited in claim 12, wherein the pairs are overlapping.

14. A method as recited in claim 12, wherein the calibration sensor is an optical sensor mounted for transverse movement with the printhead.

15. A method as recited in claim 12, wherein the printhead is an inkjet printhead having nozzles corresponding to the dot positions.

16. A printer having control logic that is configured to perform steps comprising the steps recited in claim 12.

* * * * *